United States Patent [19]

Goenner

[11] Patent Number: 5,069,977

[45] Date of Patent: Dec. 3, 1991

[54] METHOD OF PRODUCING A MULTI-PLY SOLID WOOD STRUCTURE

[75] Inventor: Siegmar Goenner, Oberkirch, Fed. Rep. of Germany

[73] Assignee: Firma Gebrüder Linck Maschinenfabrik "Gatterlinck" GmbH & Co. KG, Oberkirch, Fed. Rep. of Germany

[21] Appl. No.: 609,165

[22] Filed: Nov. 1, 1990

[30] Foreign Application Priority Data

Nov. 1, 1990 [DE] Fed. Rep. of Germany ....... 3936314

[51] Int. Cl.⁵ ................... B32S 21/04; B27G 11/00
[52] U.S. Cl. ................... 428/537.1; 144/246 R; 144/352; 156/264
[58] Field of Search ............ 428/537.1; 144/345, 144/346, 350, 351, 352; 156/264

[56] References Cited

U.S. PATENT DOCUMENTS

| | | | |
|---|---|---|---|
| 671,467 | 4/1901 | Brown | 144/346 |
| 3,580,760 | 5/1971 | Koch | 156/264 |
| 3,969,558 | 7/1976 | Sadashige | 144/346 |
| 3,970,497 | 7/1976 | Glover et al. | 144/352 |
| 4,825,917 | 5/1989 | Goenner | 144/3 P |
| 4,968,549 | 11/1990 | Simimizu et al. | 428/537.1 |

*Primary Examiner*—W. Donald Bray
*Attorney, Agent, or Firm*—Marshall, O'Toole, Gerstein, Murray & Bicknell

[57] ABSTRACT

A multi-ply solid wood structure, such as a beam, a board or a truss, and a method of manufacturing such wood structures are disclosed. The wood structure comprises wood lamellae that are joined together, wherein the wood lamellae are produced by a chipless separation from squared timber using a blade or a knife, and wherein the lamellae have a knife side that was adjacent to the knife during the process of separation and an opposite side that is remote from the knife side. In one embodiment, the wood lamellae are arranged in the multi-ply solid wood structure such that, when viewed from a center plane of the wood structure extending generally in parallel to the external surfaces of the lamellae of the wood structure, the opposite side of each wood lamellae is directed toward the two external surfaces of the wood structure.

8 Claims, 1 Drawing Sheet

METHOD OF PRODUCING A MULTI-PLY SOLID WOOD STRUCTURE

FIELD OF THE INVENTION

The present invention relates to a method of producing a multi-ply solid wood structure, such as a beam, a board or a truss. In particular, the present invention relates to a method of producing a multi-ply solid wood structure, wherein wood lamellae or plies, after the necessary processing steps, such as drying, trimming, surface treatment and the like, are bonded together in a mutually overlapped array to form the multi-ply solid wood product. The invention also comprehends to wood products produced by the method.

BACKGROUND OF THE INVENTION

It is conventional in the art to produce wood trusses that support the roofs of sheds, wood beams and even wood boards in the form of laminated components by a process wherein a plurality of wood lamellae, or wood plies, are bonded together in a sandwich-like array or structure. The wood lamellae are thin boards having a thickness ranging from a few millimeters to over one centimeter, and having lengths of up to several meters. The advantage of using such laminated structures is that the presence of a number of bonded wood plies compensates for the natural points of weaknesses in wood. The progressive overlapping bonding of the wood plies also allows the manufacture a wood structure having dimensions that exceed those dictated by the size of a natural tree trunk. Such laminated wood structures generally exhibit a substantially greater strength than non-bonded solid wood products.

It also has been demonstrated that wood plies or lamellae can be produced by the chipless cutting of squared timber with one or more blades or knives. For example, such a method is described in German Patent publication DE-OS 37 02 909A, corresponding to the U.S. Pat. No. 4,825,917, incorporated herein by reference. An important advantage in the chipless production of wood lamellae or plies is the substantial saving in raw material, because, when wood plies are produced by cutting with saws, 40% by weight or more, depending upon the thickness of the wood plies, of the timber starting material is lost as sawdust.

In the chipless production of wood plies from squared timber using a blade, the wood plies are deflected from the squared timber at the angle of the blade edge because of the unavoidable transverse dimension of the blade. This direct lateral deflection of the wood ply as the ply is separated from the squared timber leads not only to a generally biaxial warping of the wood ply, that subsequently can be substantially corrected by straightening devices, but also affects the surface structure of the cut wood ply.

In this respect, it has been discovered that the side of the wood ply, or lamella, that contacts the edge of the blade during the separation of the lamella from the squared timber, and here and hereinafter referred to as the "knife side" of the lamella, has a relatively open surface structure that occasionally has loose wood fibers projecting from the lamella. Therefore, the knife side is also referred to as the open side of the wood lamella. In contrast, the side of the wood lamella opposite the knife side, referred to here and hereinafter as the "opposite side", only has shallow depressions and is generally smooth. Accordingly, the opposite side of the lamella also is referred to as the closed side of the lamella. The differing surface properties between the knife side and the opposite side of the lamella can be significant in regard to wood structures that have a visible external surface that should be as smooth and even as possible.

Therefore, one aspect of the present invention is to provide a method of manufacturing a multi-ply solid wood structure that optimizes the use of raw material through a chipless cutting of wood plies, and that yields multi-ply wood structures that demonstrate maximum strength. In accordance with the present invention, it has been discovered that the fracture resistance under flexure of a laminated component made of cut wood lamellae produced by a blade cut can be optimized if the opposite side of each wood lamellae comprising the multi-ply wood structure is directed away from the outer surface of the multi-ply wood structure subjected to a tension load.

In accordance with a preferred embodiment of the invention, the strength of the multi-ply wood structure can be increased by arranging the wood lamella or plies such that the opposite side of each wood ply is directed towards one and the same external surface of the multi-ply wood structure. In order to best utilize the strength properties of the multi-ply wood structure, it is necessary that the external surface to which the opposite side of each wood ply is directed is positioned as the external surface remote from the acting flexing force. For reasons of appearance, it may be desirable for the lamella or ply on the opposing external surface of the multi-ply wood structure to be arranged such that opposite side of the wood ply forms the opposing external surface.

Aligning the opposite side of essentially all the wood lamellae in a multi-ply solid wood structure to be directed toward one and the same external surface of the multi-ply wood structure has a disadvantage in that the maximum load carrying capacity of such a wood structure is dependent on the alignment of the wood structure in relation to other structures joined to it. The strength properties of the solid wood structure are optimized when the opposite side of all the lamellae face one outer surface. But, then the enhanced strength properties of the solid wood structure are realized only when the structure is installed correctly, generally with the opposite side of the lamellae facing downward under the assumption that a load or bending (flexing) force that is applied from above.

If such a wood structure is installed upside down, the strength properties of the structure would be decreased. The problem of correct installation is overcome when the structure has, for example, a cross section in the shape of a parallelogram, as it is common with some roof-bearing girders, then no mispositioning can occur.

It is different, however, when the wood structure has a symmetrical cross section. Then the outer surfaces of such a structure would have to be marked in order to install the structure in the correct position. Normally, and more particularly in the case of boards and beams having a rectangular cross-section, the wood lamellae therefore are preferably aligned in the multi-ply structure such that their opposites sides are, when considered from a center plane of the multi-ply structure running parallel to the outer surfaces thereof, respectively directed toward the outer surfaces. Then, the alignment of the multi-ply structure in relation to the rest of the structure is not significant. In this embodiment, wherein the opposite sides of the lamellae all face away from the center plane, the installation of the wood structure is independent with respect to its upper or lower surface. This embodiment, however, does not possess the strength properties of the embodiment wherein the opposite side of all the lamellae face to one outer surface, provided such structure is correctly installed.

In addition to the systematic alignment of the opposite side of the wood lamellae that are joined to provide a multi-ply wood structure as discussed above, another significant factor influencing the strength of the wood structure is the production of the lamellae themselves. The method of preparing the lamellae ensures inter alia that the lamellae can be joined together into a compact block having a minimum number of gaps. Minimizing the number of gaps between the lamellae generally is accomplished by drying the lamellae after separation from the squared timber while the lamellae are subjected to a sufficient load to correct the warp that arises due to the separation process. The lamellae usually then are trimmed along their longitudinal edges, and can, in addition, be lightly sanded on their principal surfaces in order to more particularly remove any projecting wood fibers present on the knife side of the lamellae. Furthermore, it is known in the art to sand the finished multi-ply wood structure to provide a desired surface smoothness and appearance.

DETAILED DESCRIPTION OF THE PREFERRED EMBODIMENT

Figure 1A:
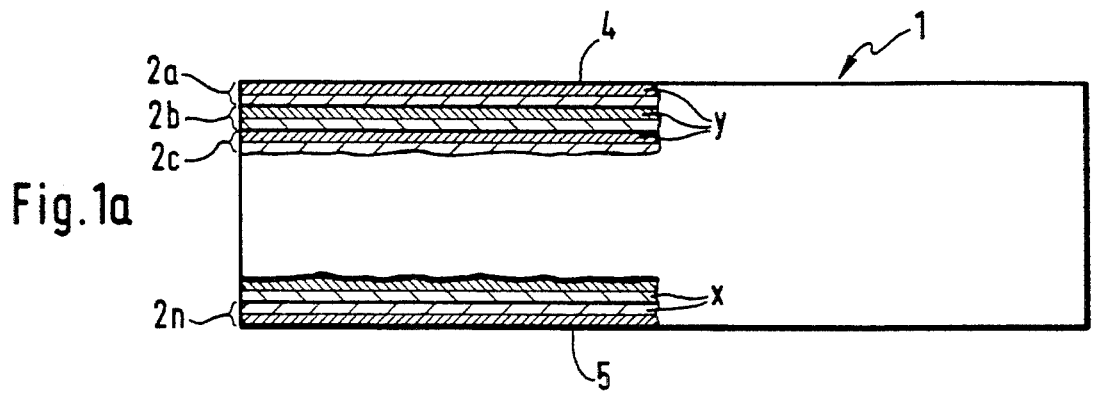
FIG. 1 illustrates a multi-ply beam in longitudinal section (FIG. 1a), and in cross section (FIG. 1b), wherein the opposite side of each lamella, except for the opposite side of the lowermost lamella, are aligned in the direction of one and the same external surface of the beam.
Figure 1B:
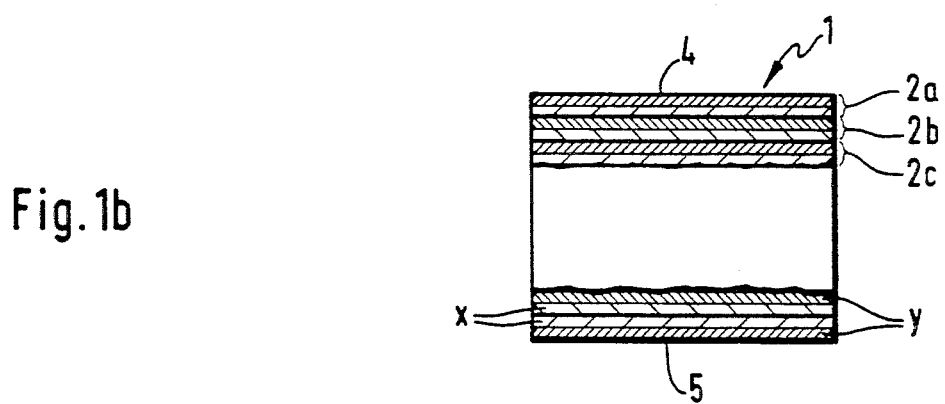

The invention will now be described with reference to the accompanying drawings. FIGS. 1a and 1b illustrate a wood structure 1 made in accordance with the present invention. Wood structure 1 is in the form of a multi-ply beam, comprising a plurality of stacked plies or lamellae of wood 2a through 2n. The wood lamellae 2a through 2n are manufactured by a chipless separation from a piece of squared timber using a blade, or knife, and wherein each lamella has a knife side x, i.e. the side of the lamella that was adjacent to the blade or knife during the separation, and an opposite side y, i.e. the surface of the lamella that is opposite the knife side. Owing to the method of separating the lamellae from the squared timber, the knife side x of the wood lamellae 2a through 2n have a generally open surface structure. Accordingly, in the accompanying figures, the knife side is shown with coarse shading. In contrast, the opposite y of the wood lamellae 2a through 2n, that are remote from the blade or knife, have a smoother or more closed surface structure. Accordingly, the opposite side y is illustrated in the figures with closer shading lines. To make the figures more straightforward, the knife side x and the opposite side y of each wood lamella 2a through 2n is shown separated by a thin line.

In the embodiment of the present invention illustrated in FIGS. 1a and 1b, the wood lamellae 2a through 2n are vertically stacked in a multi-ply array such that the opposite side y of each wood lamellae 2a through 2n is, but for one exception, directed toward an external surface 4 of the wood structure 1. In the particular illustrated embodiment, a wood lamellae 2n is the lowermost lamella of the wood product 1, and is aligned such that its opposite side y is directed toward, and forms, the external surface 5. This alignment positions the opposite side of the lamella 2n such that external surface 5 has a smoother or more closed finish.

Figure 2A:
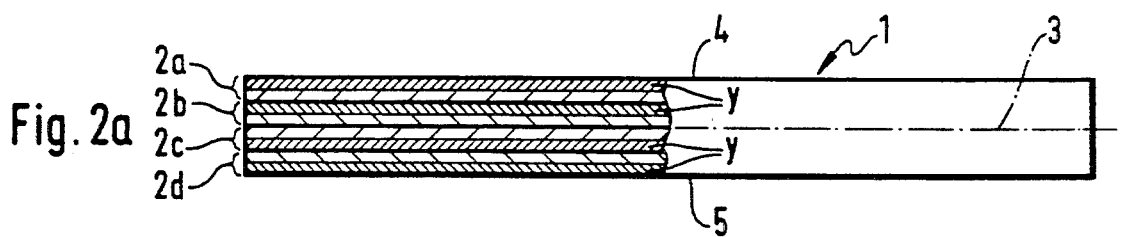
FIG. 2 illustrates a multi-ply beam in longitudinal section (FIG. 2a), and in cross section (FIG. 2b), wherein, when viewed from a neutral or stress-free center plane of the multi-ply beam, the opposite side of the wood lamellae are aligned in the direction of the two external surfaces of the beam.
Figure 2B:
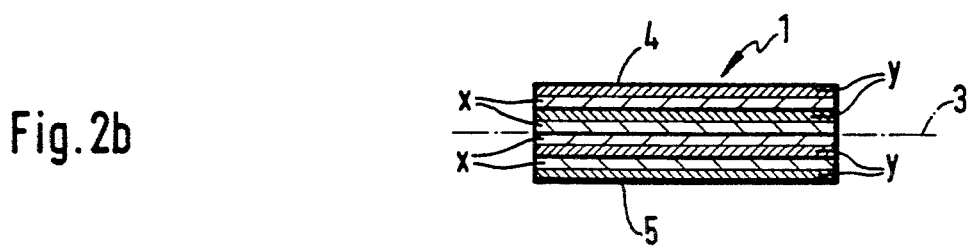

In contrast to FIGS. 1a and 1b, wherein the opposite side y of the wood lamellae 2a through 2n, with the possible exception of the wood lamella 2n, are all aligned toward the external surface 4 of the wood product 1, FIGS. 2a and 2b illustrate a wood product 1 in the form of a four-ply board, wherein the wood lamellae 2a through 2d are aligned such that their opposite sides y are directed, as considered from the neutral center plane 3 of the wood product 1, in the direction of the external surfaces 4 and 5, respectively. The center plane 3 is the neutral, stress-free plane of the wood product 1, when the wood product 1 is under load. If the cross-section of the wood structure 1 is not symmetrical, i.e. includes an odd number of lamellae, the center plane 3 is not exactly in the center of the wood structure 1, in a dimensional sense. Accordingly, in FIG. 2, at the center plane 3, indicated by line and dot shading, the knife side x of the wood lamellae 2b and 2c are adjacent to and in contact with one another. As considered from the center plane 3, and respectively towards the external surfaces 4 and 5, the opposite side y and of the knife side x of the wood lamellae 2a through 2d are positioned to alternate.

In order to enhance the strength properties of the wood structure 1, and in accordance with the embodiment illustrated in FIG. 1, the external surface 4 of wood product 1 is positioned to be the external surface remote from the action of the flexing force because essentially all the opposite sides y of the wood lamellae 2a through 2n are directed towards the external surface 4 of the wood structure 1. In the case of the embodiment illustrated in FIG. 2, the opposite side y of the wood lamellae 2a through 2d, as considered from the center plane 3, are directed in equal numbers toward the external surfaces 4 and 5, and therefore the alignment of the wood structure 1, when installed, is unimportant in regard to enhancing the strength properties of wood structure 1 in FIG. 2.

What is claimed is:

1. A method of producing multi-ply solid wood structures comprising:
    a) separating a squared timber into lamellae with a blade, said lamellae having a knife side that was in contact with the blade and having an opposite side that is opposite the knife side, and
    b) arranging and securing the lamellae in a stacked array above and below a center plane extending parallel to the surfaces of the lamellae, to form a multi-ply solid wood structure such that, from said center plane of the wood structure, above or below said center plane, the knife side of each lamella is directed toward said center plane of the wood structure.

2. The method of claim 1 wherein essentially all the lamellae of the wood structure are aligned such that the knife side of each lamella is directed to a first outer surface of the wood structure.

3. The method of claim 2 wherein a lamella forming a second outer surface of the wood structure is aligned such that the opposite side of the lamella is directed in an external direction.

4. The method of claim 1 wherein the lamellae are aligned such that the knife side of each lamella above and below said center plane is directed toward said center plane of the wood structure.

5. A multi-ply solid wood product comprising wood lamellae joined in a stacked array as a plurality of plies, wherein the wood lamellae are produced by separation from squared timber by means of a blade, and the wood lamellae each have a knife side that was adjacent to the blade during the separation process and an opposite side opposite the knife side; and wherein the wood lamellae are arranged such that, starting from a center plane of the wood product running parallel to the surfaces of the lamellae and at least toward a first outer surface of the wood product, the opposite side of each wood lamella is directed toward the first outer surface of the wood product.

6. The wood product of claim 5 wherein the opposite side of essentially all the wood lamellae are directed toward the first outer surface of the wood product.

7. The wood product of claim 6 wherein the wood lamella forming a second outer surface of the wood product is aligned such that the opposite side of the wood lamella is directed in an external direction.

8. The wood product of claim 5 wherein, starting from the center plane of the wood product, the knife side of each wood lamella is directed toward said center plane of the wood product.

* * * * *